(12) United States Patent
Yamanaka

(10) Patent No.: US 10,710,521 B2
(45) Date of Patent: Jul. 14, 2020

(54) ABNORMALITY MONITORING DEVICE AND ELECTRIC POWER STEERING DEVICE USING SAME

(71) Applicant: DENSO CORPORATION, Kariya, Aichi-pref. (JP)

(72) Inventor: Takahiro Yamanaka, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 149 days.

(21) Appl. No.: 16/076,902

(22) PCT Filed: Dec. 26, 2016

(86) PCT No.: PCT/JP2016/088609
§ 371 (c)(1),
(2) Date: Aug. 9, 2018

(87) PCT Pub. No.: WO2017/138271
PCT Pub. Date: Aug. 17, 2017

(65) Prior Publication Data
US 2019/0047492 A1    Feb. 14, 2019

(30) Foreign Application Priority Data

Feb. 12, 2016    (JP) .................. 2016-024406

(51) Int. Cl.
*B60R 16/023*    (2006.01)
*B62D 6/00*    (2006.01)
(Continued)

(52) U.S. Cl.
CPC .......... *B60R 16/0232* (2013.01); *B60R 16/02* (2013.01); *B62D 5/04* (2013.01);
(Continued)

(58) Field of Classification Search
CPC ... B60R 16/0232; B60R 16/02; B62D 5/0463; B62D 5/0487; B62D 5/00; B62D 5/04; G06F 1/24; G06F 11/0757; G06F 11/0793
(Continued)

(56) References Cited

U.S. PATENT DOCUMENTS

2011/0043323 A1* 2/2011 Hamasako ............... G05B 9/03
340/3.43
2015/0046115 A1    2/2015 Shimono et al.

FOREIGN PATENT DOCUMENTS

JP    H03-31065 A    2/1991
JP    H11-65893 A    3/1999
(Continued)

*Primary Examiner* — Isaac G Smith
(74) *Attorney, Agent, or Firm* — Maschoff Brennan

(57) ABSTRACT

An abnormality monitoring device includes a control unit and a monitoring unit. The control unit includes a self-diagnosis circuit configured to perform a self-diagnosis processing during which other processing is inhibited. The monitoring unit includes an abnormality monitoring circuit and a reset circuit. The abnormality monitoring circuit is configured to perform an abnormality monitoring of the control unit. The reset circuit is configured to reset the control unit when the abnormality monitoring circuit decides an abnormality of the control unit. The abnormality monitoring circuit is configured to determine whether the self-diagnosis processing is finished, disable the abnormality monitoring of the control unit during the self-diagnosis processing, and start the abnormality monitoring of the control unit when the self-diagnosis processing is determined to be finished. Accordingly, the abnormality of the control unit is accurately monitored.

4 Claims, 7 Drawing Sheets

(51) Int. Cl.
  *B60R 16/02* (2006.01)
  *B62D 5/04* (2006.01)
  *G06F 11/07* (2006.01)
  *G06F 1/24* (2006.01)
(52) U.S. Cl.
  CPC ............ *B62D 5/0463* (2013.01); *B62D 6/00* (2013.01); *G06F 1/24* (2013.01); *G06F 11/07* (2013.01); *G06F 11/0757* (2013.01); *G06F 11/0793* (2013.01)
(58) Field of Classification Search
  USPC .......................................................... 701/41
  See application file for complete search history.

(56) References Cited

FOREIGN PATENT DOCUMENTS

| | | |
|---|---|---|
| JP | 2010-200552 | 9/2010 |
| JP | 2015-215743 A | 12/2015 |
| JP | 2016-71635 A | 5/2016 |
| WO | 2013/137425 A1 | 9/2013 |

\* cited by examiner

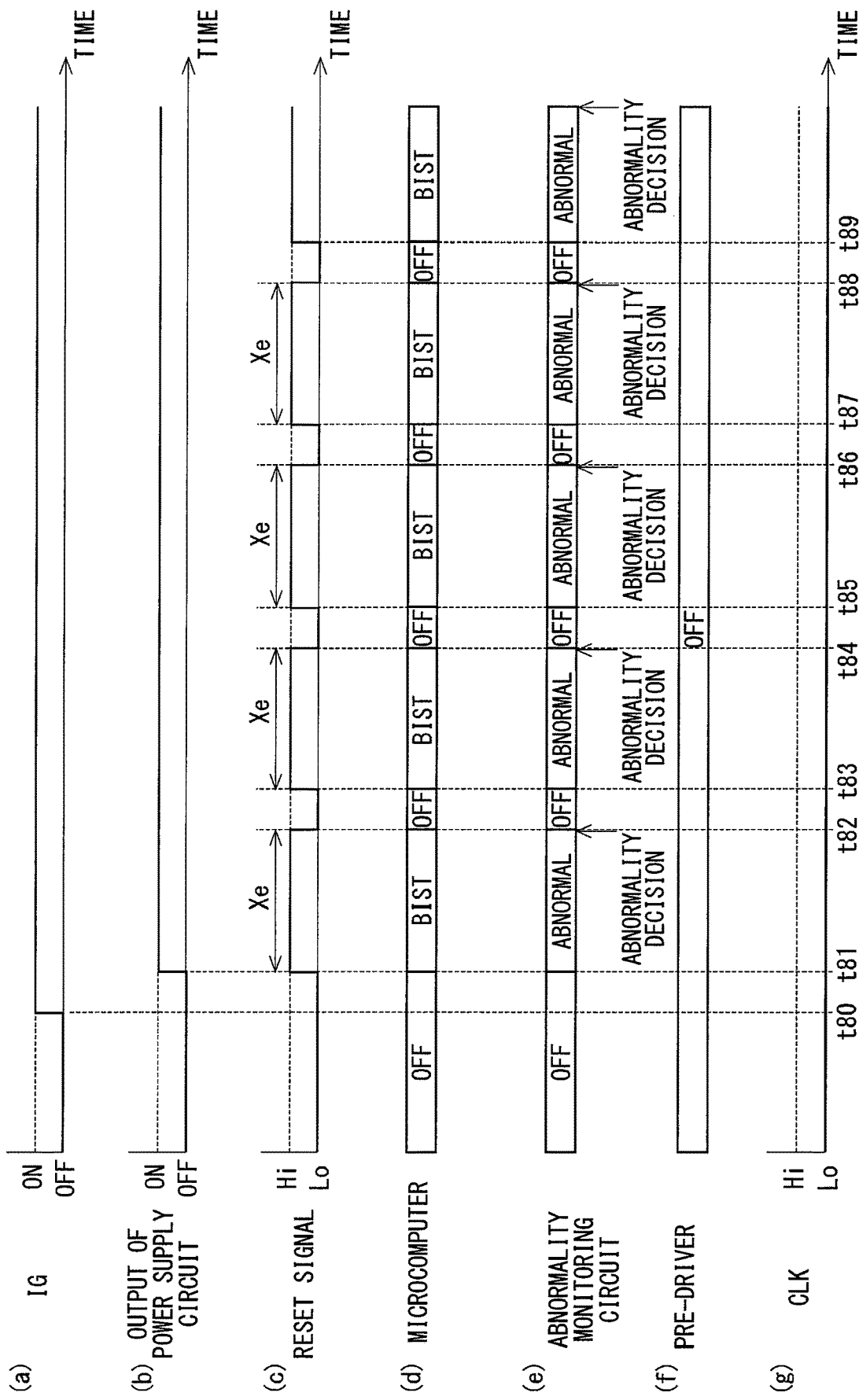

ABNORMALITY MONITORING DEVICE AND ELECTRIC POWER STEERING DEVICE USING SAME

CROSS REFERENCE TO RELATED APPLICATION

This application is based on Japanese Patent Application No. 2016-24406 filed on Feb. 12, 2016, the disclosure of which is incorporated herein by reference.

TECHNICAL FIELD

The present disclosure relates to an abnormality monitoring device and an electric power steering device using the same.

BACKGROUND ART

Conventionally, there has been known an abnormality monitoring using a watchdog signal. For example, in a patent literature 1, a watchdog timer circuit is used to detect a watchdog timeout and to measure a wait time. When an arbitrarily set wait time elapses after the watchdog timeout is detected, a reset signal, an interrupt signal, a control signal and the like are generated.

PRIOR ART LITERATURE

Patent Literature

Patent literature 1: JP H11-65893 A

SUMMARY OF INVENTION

Recently, there is a microcomputer having a Built In Self-Test (BIST) function. User programs do not operate during a BIST processing. For example, when an abnormality of the microcomputer is monitored from outside of the microcomputer, there is a possibility that the BIST processing is erroneously detected as the abnormality of the microcomputer.

It is an object of the present disclosure to provide an abnormality monitoring device and an electric power steering device using the abnormality monitoring device capable of properly monitoring an abnormality of a control unit.

According to an aspect of the present disclosure, an abnormality monitoring device includes a control unit and a monitoring unit. The control unit includes a self-diagnosis circuit configured to perform a self-diagnosis processing during which other processing is inhibited. The monitoring unit includes an abnormality monitoring circuit and a reset circuit. The abnormality monitoring circuit is configured to perform an abnormality monitoring of the control unit. The reset circuit is configured to reset the control unit when the abnormality monitoring circuit decides an abnormality of the control unit.

The abnormality monitoring circuit is configured to determine whether the self-diagnosis processing is finished. The abnormality monitoring circuit is configured to disable the abnormality monitoring of the control unit during the self-diagnosis processing, and start the abnormality monitoring of the control unit when the self-diagnosis processing is determined to be finished.

Accordingly, a state where the other processing is not executed because the control unit is performing the self-diagnosis processing is restricted from being erroneously determined as the abnormality of the control unit.

According to a second aspect of the present disclosure, an electric power steering device includes the abnormality monitoring device according to the first aspect of the present disclosure and a motor. The motor is configured to output an assist torque for assisting a steering of a steering member by a driver.

Accordingly, a state where the other processing is not executed because the control unit is performing the self-diagnosis processing is restricted from being erroneously determined as the abnormality of the control unit.

BRIEF DESCRIPTION OF DRAWINGS

The above and other objects, features and advantages of the present disclosure will become more apparent from the following detailed description made with reference to the accompanying drawings, in which:

FIG. 8 is a time chart illustrating an abnormality monitoring processing according to a comparative example.

DESCRIPTION OF EMBODIMENTS

Hereinafter, an abnormality monitoring device and an electric power steering device using the same according to the present disclosure will be described with reference to the drawings.

Embodiment

An embodiment of the present disclosure will be described in FIG. 1 to FIG. 7.

Figure 1:
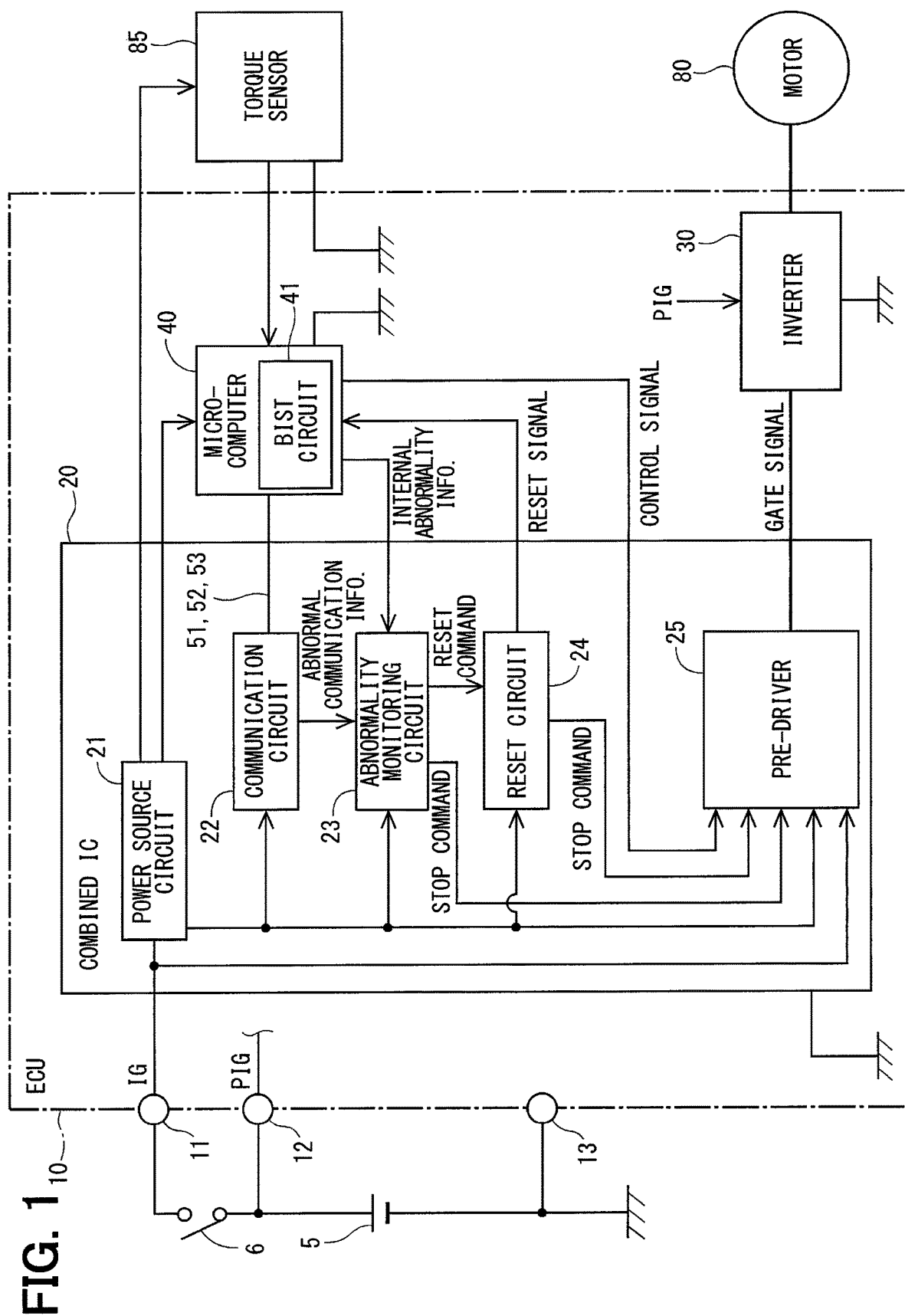
FIG. 1 is a block diagram illustrating an abnormality monitoring device according to an embodiment of the present disclosure.
Figure 2:
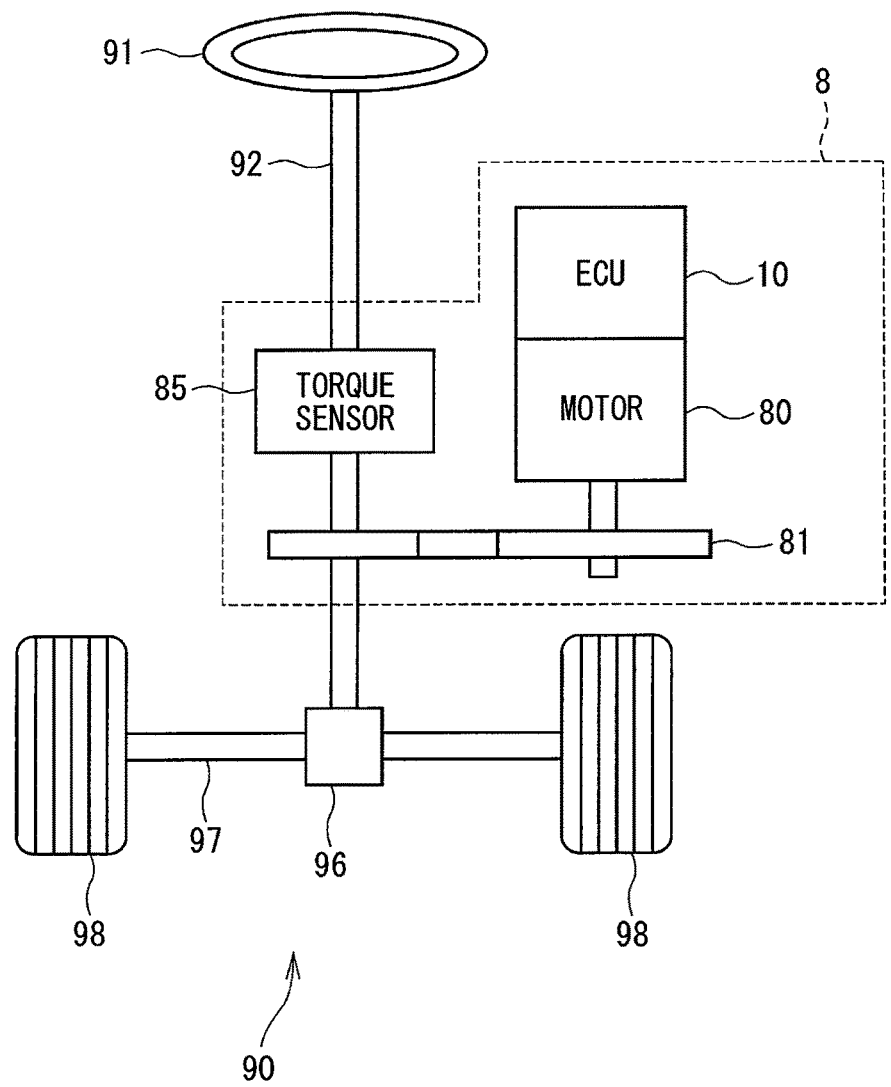
FIG. 2 is a diagram illustrating a schematic structure of a steering system according to the embodiment of the present disclosure.

As shown in FIG. 1 and FIG. 2, an ECU 10 as an abnormality monitoring device is applied to, with a motor 80, an electric power steering device 8 assisting a steering operation by a driver.

FIG. 2 is a diagram showing a configuration of a steering system 90 including the electric power steering device 8, The steering system 90 includes a steering wheel 91 as a steering member, a steering shaft 92, a pinion gear 96, a rack shaft 97, wheels 98 and the electric power steering device 8.

The steering wheel 91 is connected to the steering shaft 92. The steering shaft 92 is provided with a torque sensor 85 that detects a steering torque Ts applied when the driver operates the steering wheel 91. The pinion gear 96 is provided at a tip of the steering shaft 92. The pinion gear 96 meshes with the rack shaft 97. A pair of wheels 98 is coupled to both ends of the rack shaft 97 via a tie rod or the like.

When the driver rotates the steering wheel 91, the steering shaft 92 connected to the steering wheel 91 is rotated. The rotational movement of the steering shaft 92 is converted to the linear movement of the rack shaft 97 by the pinion gear 96. The wheels 98 are steered to angles corresponding to the amount of displacement of the rack shaft 97.

The electric power steering device 8 includes the motor 80, a deceleration gear 81, the torque sensor 85 and the ECU 10. The deceleration gear 81 decelerates the rotation of the motor 80 and transmits the decelerated rotation to the steering shaft 92. Although the electric power steering device 8 in the present embodiment is a so-called "column assist type" power steering device, the electric power steering device 8 may be a so-called "rack assist type" power steering device that transmits the rotation of the motor 80 to the rack shaft 97.

The motor 80 is configured to output an assist torque assisting the steering of the steering wheel 91 by the driver. The motor 80 is driven by being supplied with an electric power from a battery 5 (see FIG. 1) as a power source to rotate the deceleration gear 81 positively and negatively.

As shown in FIG. 1, the ECU 10 includes an IG terminal 11, a PIG terminal 12 and a ground terminal 13. The IG terminal 11 is connected to the battery 5 via a starting switch 6 such as an ignition switch. The PIG terminal 12 is directly connected to the battery 5 without being connected to the starting switch 6. The ground terminal 13 is connected to the ground.

Figure 3:
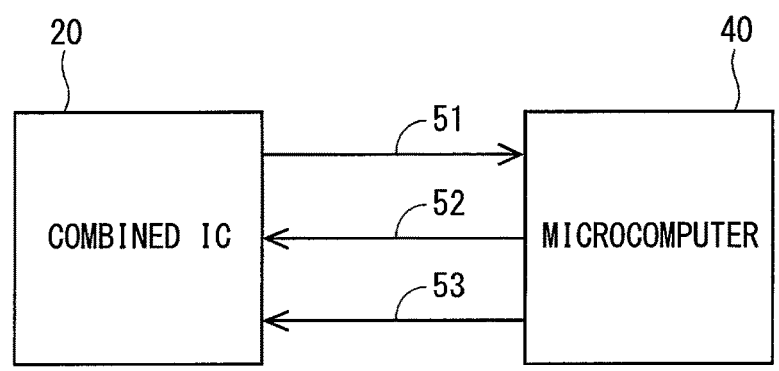
FIG. 3 is a diagram illustrating a communication line between a combined IC and a microcomputer according to the embodiment of the present disclosure.

The ECU 10 includes a combined IC 20 as a monitoring unit, an inverter 30 and a microcomputer 40 as a control unit. As shown in FIG. 3, between the combined IC 20 and the microcomputer 40, three communication lines 51, 52 and 53 are provided. The communication line 51 is used to transmit information from the combined IC 20 to the microcomputer 40. The communication line 52 is used to transmit information from the microcomputer 40 to the combined IC 20. The communication line 53 is used to output a clock signal for synchronizing the combined IC 20 and the microcomputer 40. The clock signal is output from the microcomputer 40 to the combined IC 20.

Each processing implemented by the combined IC 20 and the microcomputer 40 may be a software processing achieved by a CPU executing computer programs that are preliminarily stored in a tangible memory device such as a ROM, or a hardware processing achieved by a special purpose electronic circuit.

Back to FIG. 1, the combined IC 20 includes a power source circuit 21, a communication circuit 22, an abnormality monitoring circuit 23, a reset circuit 24 and a pre-driver 25 as a driving circuit.

For example, the power source circuit 21 is a regulator. The power source circuit 21 adjusts an power source voltage that is input via the IG terminal 11 into a predetermined voltage, and supplies the adjusted voltage to the communication circuit 22, the abnormality monitoring circuit 23, the reset circuit 24, the pre-driver 25, the microcomputer 40 and the torque sensor 85.

The communication circuit 22 communicates with the microcomputer 40 using the communication lines 51 to 53. In the present embodiment, the communication form is a serial communication. In another embodiment, the communication form may be a parallel communication. When an abnormality occurs in the communication with the microcomputer 40, the communication circuit 22 outputs to the abnormality monitoring circuit 23 an abnormal communication information indicating that the abnormal communication occurs.

The abnormality monitoring circuit 23 monitors the abnormality of the microcomputer 40. The abnormality monitoring circuit 23 determines the abnormality of the microcomputer 40 based on clock signals that are output from the microcomputer 40 at predetermined intervals in a normal state. When the abnormality monitoring circuit 23 does not receive the clock signals, the abnormality monitoring circuit 23 determines that the abnormality occurs in the microcomputer 40. When a state where the microcomputer 40 is determined as being abnormal, that is, a state where the abnormality monitoring circuit 23 does not receive the clock signals continues for an abnormality decision time Xe, the abnormality monitoring circuit 23 decides the abnormality of the microcomputer 40.

The abnormality monitoring circuit 23 acquires the abnormal communication information, internal abnormality information and the like. The internal abnormality information is based on results of internal monitoring executed by a user program in the microcomputer 40. The internal monitoring is executed separately from a BIST processing, which will be described later.

When the abnormality of the microcomputer 40 or the abnormal communication occurs, the abnormality monitoring circuit 23 outputs to the reset circuit 24 a reset command for resetting the microcomputer 40. When the abnormality of the microcomputer 40 or the abnormal communication occurs, the abnormality monitoring circuit 23 outputs to the pre-driver 25 a stop command for stopping the motor 80.

The reset circuit 24 outputs to the microcomputer 40 a reset signal based on the reset command. In the present embodiment, when the reset signal is "Lo", the microcomputer 40 is reset, and when the reset signal is "Hi", the reset of the microcomputer 40 is released.

The reset circuit 24 outputs to the pre-driver 25 a stop command for stopping the motor 80.

The pre-driver 25 is supplied with the voltage input to the IG terminal 11 and the voltage adjusted by the power source circuit 21. The pre-driver 25 is the driving circuit driving the inverter 30 based on the control signal output from the microcomputer 40. In details, the pre-driver 25 generates a gate signal based on the control signal and outputs the generated gate signal to each switching element of the inverter 30.

When the abnormality of the microcomputer 40 or the abnormal communication occurs, the pre-driver 25 stops outputting the gate signal based on the signal from the abnormality monitoring circuit 23 or the reset circuit 24. Specifically, the pre-driver 25 stops outputting the gate signal by changing the gate signals of all of the switching elements of the inverter 30 to the off commands. Even through the steering assist is switched to a manual assist, by stopping the output of the pre-driver 25 in the abnormal state, a self-steering caused by the motor 80 driven based on the abnormal command is restricted.

The inverter 30 includes unillustrated switching elements connected to form bridges. By switching ON and OFF of each switching element, the voltage applied to a winding wire of the motor 80 is controlled. The inverter 30 is supplied with the electric power from the PIG terminal 12.

The microcomputer 40 controls the driving of the motor 80 based on the signal from the torque sensor 85 and a signal from an unillustrated rotation angle sensor that detects a rotation angle of the motor 80. Specifically, the microcomputer 40 generates the control signal controlling the ON and OFF operation of each switching element of the inverter 30 based on the steering torque and an electric angle of the motor 80. The generated control signal is output to the pre-driver 25 and the operation of the switching element of the inverter 30 is controlled based on the control signal. The microcomputer 40 controls the driving of the motor 80 by controlling the switching element of the inverter 30.

The microcomputer 40 includes a BIST circuit 41 as a self-diagnosis circuit. As such, the microcomputer 40 has the BIST function. Hereinafter, a self-diagnosis processing executed by the BIST circuit 41 will be referred to as a "BIST processing". During the BIST processing, user programs other than the BIST processing are inhibited and the use programs do not operate in the microcomputer 40. That is, during the BIST processing, the clock signals are not output from the microcomputer 40 to the combined IC 20.

Figure 4:
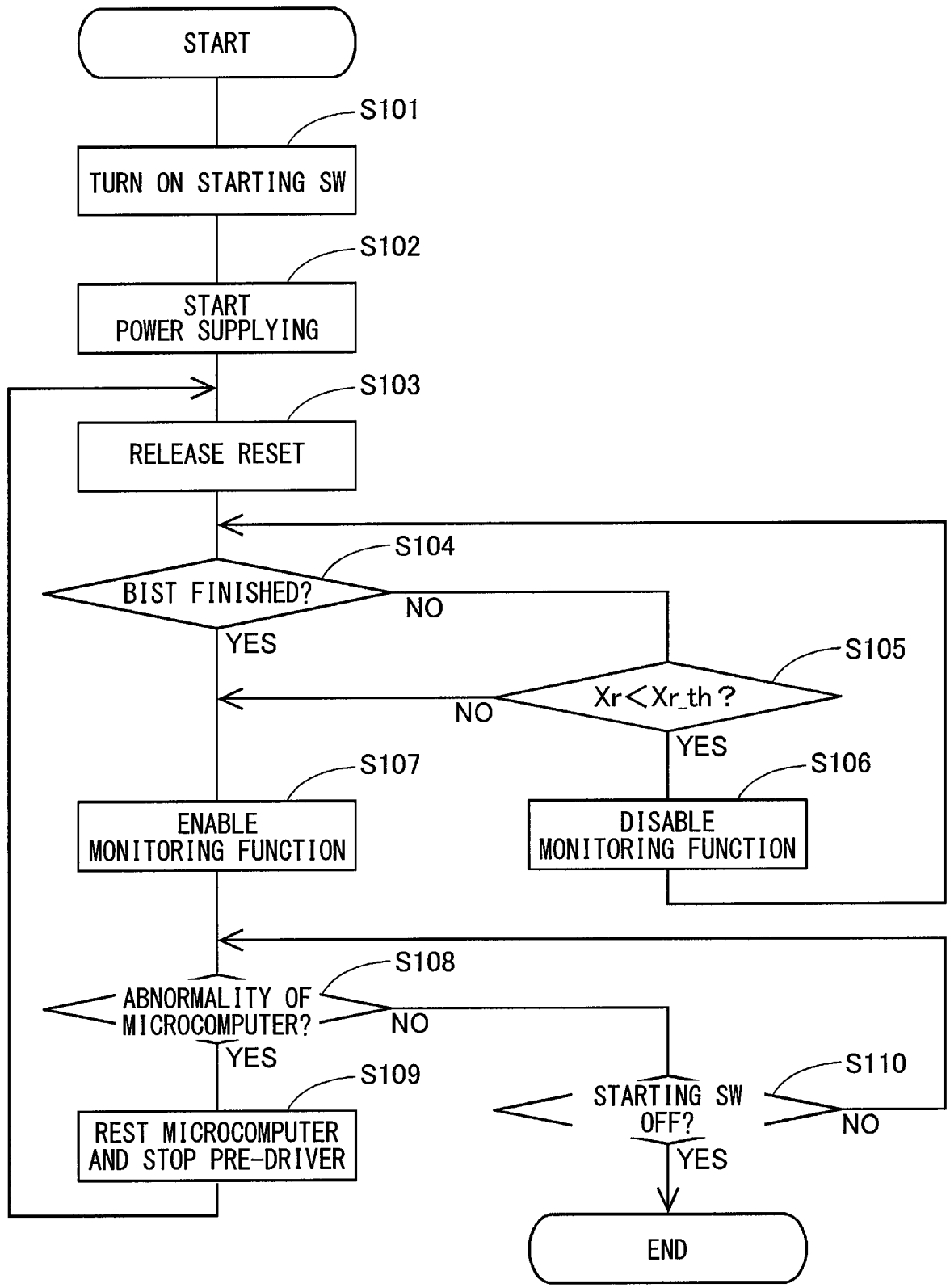
FIG. 4 is a flowchart illustrating an abnormality monitoring processing according to the embodiment of the present disclosure.

The abnormality monitoring processing in the present embodiment will be described with reference to a flow chart shown in FIG. 4. The processing of FIG. 4 is mainly executed by the combined IC 20.

At S101, the starting switch 6 is turned on. At S102, the power source circuit 21 starts to supply the electric power. Even when the power source circuit 21 stats to supply the electric power, the abnormality monitoring circuit 23 does not start the abnormality monitoring of the microcomputer 40 and disables the abnormality monitoring function.

In the present embodiment, a state where the electric power is supplied to the abnormality monitoring circuit 23 but the abnormality monitoring circuit 23 does not execute the abnormality monitoring of the microcomputer 40 is referred to as "disablement of the abnormality monitoring function". A state where the abnormality monitoring circuit 23 executes the abnormality monitoring of the microcomputer 40 is referred to as "enablement of the abnormality monitoring function".

At S103, the reset circuit 24 sets the reset signal to be "Hi" and releases the reset of the microcomputer 40. Also, the reset circuit 24 starts to measure a reset release time Xr that is a time period elapsing after the release of the reset. The reset release time Xr may be also described as a time period elapsing after the BIST processing is started.

In the microcomputer 40, when the reset signal is switched from "Lo" to "Hi" and the reset is released, the BIST processing is started. In the microcomputer 40, when the BIST processing is finished, the user programs including the output of the clock signals are executed.

At S104, the abnormality monitoring circuit 23 determines whether the BIST processing of the microcomputer 40 is finished. Details for determining the finish of the BIST processing will be described later. When the BIST processing is determined as being finished (S104: YES), the processing proceeds to S107. When the BIST processing is determined as being continued (S104: NO), the processing proceeds to S105.

At S105, the abnormality monitoring circuit 23 determines whether the reset release time Xr is less than an elapse determination time Xr_th. The elapse determination time Xr_th is longer than a time required for the microcomputer 40 to execute the BIST processing normally. When the reset release time Xr is determined to be equal to or greater than the elapse determination time Xr_th (S105: NO), the processing proceeds to S107. When the reset release time Xr is determined to be less than the elapse determination time Xr_th (S105: YES), the processing proceeds to S106.

At S106, the abnormality monitoring circuit 23 continues the state where the abnormality monitoring function of the microcomputer 40 is disabled, and the processing returns to the S104. That is, the abnormality monitoring circuit 23 does not execute the abnormality monitoring of the microcomputer 40 while the microcomputer 40 is performing the BIST processing and the reset release time Xr is less than the elapse determination time Xr_th.

At the S107, to which the processing proceeds when the BIST processing is determined to be finished (S104: YES) or when the reset release time Xr is equal to or greater than the elapse determination time Xr_th, the abnormality monitoring circuit 23 enables the abnormality monitoring function of the microcomputer 40 and starts the abnormality monitoring of the microcomputer 40.

At S108, the abnormality monitoring circuit 23 determines whether the microcomputer 40 is abnormal. In the present embodiment, the abnormality monitoring circuit 23 determines that the microcomputer 40 is abnormal when the state where the clock signals are not received continues for the abnormality decision time Xe. When the microcomputer 40 is determined to be normal (S108: NO), the processing proceeds to S110. When the microcomputer 40 is determined to be abnormal (S108: YES), the processing proceeds to S109.

At S109, the abnormality monitoring circuit 23 outputs the reset command to the reset circuit 24. The reset circuit 24 switches the reset signal to "Lo" and resets the microcomputer 40. The abnormality monitoring circuit 23 and the reset circuit 24 output the stop command to the pre-driver 25. The pre-driver 25 receiving the stop command sets the gate signal of each of the switching elements to the off command.

When a reset time Xc elapses from the reset of the microcomputer 40, the processing proceeds to S103. In other words, when the reset time Xc elapses from the reset of the microcomputer 40, the reset signal is set to be "Hi" and the reset of the microcomputer 40 is released. The microcomputer 40 is restarted when the processing proceeds from the S109 to S103. When the abnormality of the microcomputer 40 is not resolved even when the microcomputer 40 is restarted, the calculation of the microcomputer 40 may be stopped. The number of times for restarting the microcomputer 40 before stopping the microcomputer 40 may be arbitrarily set.

At S110 to which the processing proceeds when the microcomputer 40 is determined to be normal (S108: NO), the abnormality monitoring circuit 23 determines whether the starting switch 6 is turned off. When the starting switch 6 is determined not to be turned off (S110: NO), the processing returns to S108. That is, the abnormality monitoring circuit 23 continues the abnormality monitoring of the microcomputer 40. When the starting switch 6 is determined to be turned off (S110: YES), the processing is finished.

The abnormality monitoring processing of the present embodiment will be described with reference to time charts of FIG. 5 to FIG. 7.

Figure 5:
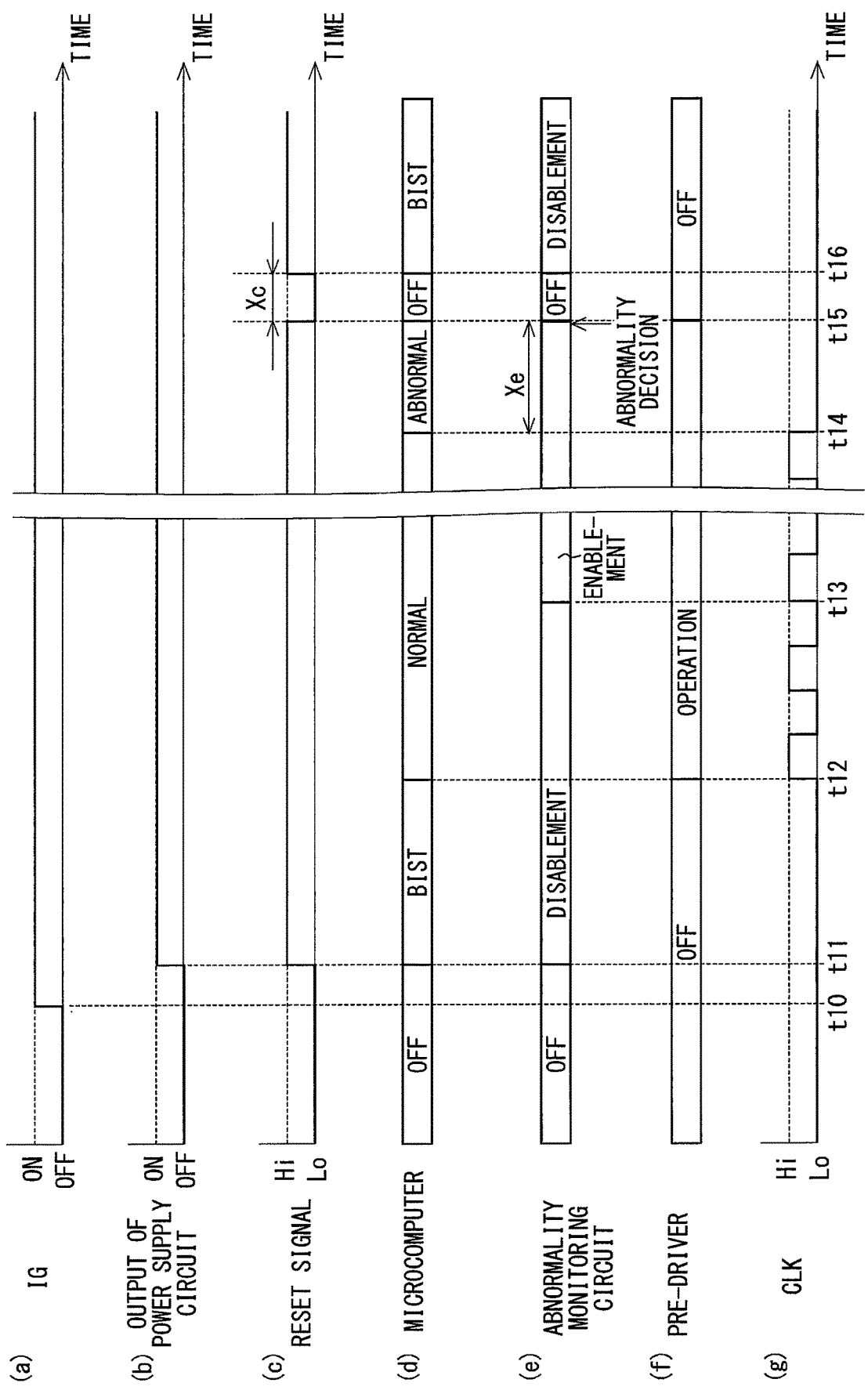
FIG. 5 is a time chart illustrating the abnormality monitoring processing according to the embodiment of the present disclosure.

In FIG. 5, (a) illustrates ON/OFF state of the starting switch 6, (b) illustrates an output state of the power source circuit 21, (c) illustrates the reset signal, (d) illustrates the state of the microcomputer 40, (e) illustrates the state of the abnormality monitoring circuit 23, (f) illustrates the state of the pre-driver, and the (g) illustrates the clock signal from the microcomputer 40. FIG. 6 and FIG. 8 are similar to FIG. 5. In FIG. 5 to FIG. 8, the starting switch 6 is described as "IG", and the clock signal is described as "CLK". Since the time scale shown in FIG. 5 to FIG. 8 is appropriately modified for the purpose of illustration, the time scale in the drawings does not necessarily consist with actual time scale.

As shown in FIG. 5, before a time point t10 at which the starting switch 6 is turned on, the power source circuit 21, the microcomputer 40, the abnormality monitoring circuit 23, the reset circuit 24 and the pre-driver 25 are turned off. The reset signal of the reset circuit 24 and the clock signal are "Lo".

After the starting switch 6 is turned on at the time point t10, the power source circuit 21 is turned on at a time point t11. After the power source circuit 21 is turned on, the reset signal is changed to "Hi", the reset state of the microcomputer 40 is released, and the BIST processing is started. Also, after the power source circuit 21 is turned on, the power supplying to the abnormality monitoring circuit 23 is started. However, at the time point t11, the monitoring function of the microcomputer 40 by the abnormality monitoring circuit 23 is disabled.

After the BIST processing is finished normally at a time point t12, the operation of the user program is started. After the operation of the user program is started, the output of the clock signal from the microcomputer 40 to the combined IC 20 is started. The operation of the pre-driver 25 is started based on the control signal from the microcomputer generated by the user program.

In the present embodiment, the property that the user programs are not executed during the BIST processing is used. When the clock signal is received for a determination number of times (e.g., three times) within a determination time Xa, the abnormality monitoring circuit 23 determines that the operation of the user programs is started and enables the abnormality monitoring of the microcomputer 40.

Although the determination number of times is not limited to three times, the determination number of times is preferred to be multiple times. For example, as shown in (a) of FIG. 7, there is a possibility that the clock signal is recognized as "Hi" due to a noise. When the clock signal is not received for the determination number of times within the determination time Xa, a count value of the clock signal is cleared. As such, erroneous determination caused by the noise is restricted. (b) of FIG. 7 illustrates the count value of the clock signal.

Figure 7:
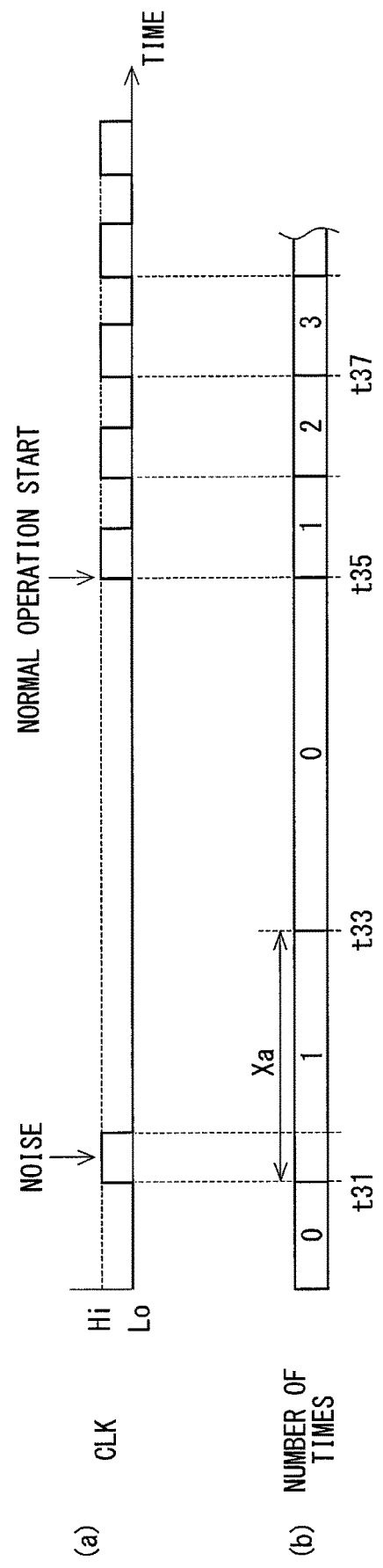
FIG. 7 is a time chart illustrating an determination of finish of a BIST processing according to the embodiment of the present disclosure.

Specifically, as shown in FIG. 7, when the clock signal is not detected for the determination number of times since the clock signal is detected at a time point t31 and until the determination time Xa elapses, the clock signal detected at the time point t31 is determined as the noise, and the count value of the clock signal is cleared at a time point t33 after the determination time Xa elapses.

After the BIST processing of the microcomputer 40 is finished at a time point t35 and the user programs start to operate normally, the clock signal is output at predetermined intervals. In this case, the abnormality monitoring circuit 23 determines that the BIST processing of the microcomputer 40 is finished at a time point t37 when the clock signal is received for the determination number of times. Then, the abnormality monitoring circuit 23 enables the monitoring function and starts the abnormality monitoring of the microcomputer 40.

Back to FIG. 5, the abnormality monitoring circuit 23 enables the abnormality monitoring of the microcomputer 40 at a time point t13 when the clock signal is detected for the determination number of times. Suppose that the abnormality occurs in the microcomputer 40 at a time point t14 and the clock signal is not output. When the time period in which the clock signal is not detected continues over the abnormality decision time Xe, the abnormality monitoring circuit 23 decides the abnormality of the microcomputer 40 at a time point t15. After the abnormality monitoring circuit 23 decides the abnormality of the microcomputer 40, the reset signal is changed to "Lo", the microcomputer 40 is reset, and the operation of the pre-driver 25 is stopped.

The reset signal is changed to "Hi" at a time point t16 when the abnormality decision time Xe elapses after the reset signal is changed to "Lo". When the reset signal is changed to "Hi", the reset of the microcomputer 40 is released and the BIST processing is performed again. In this case, since the BIST processing is started in a state where the abnormality monitoring circuit 23 is disabled, the reset of the microcomputer 40 is not repeated.

Figure 6:
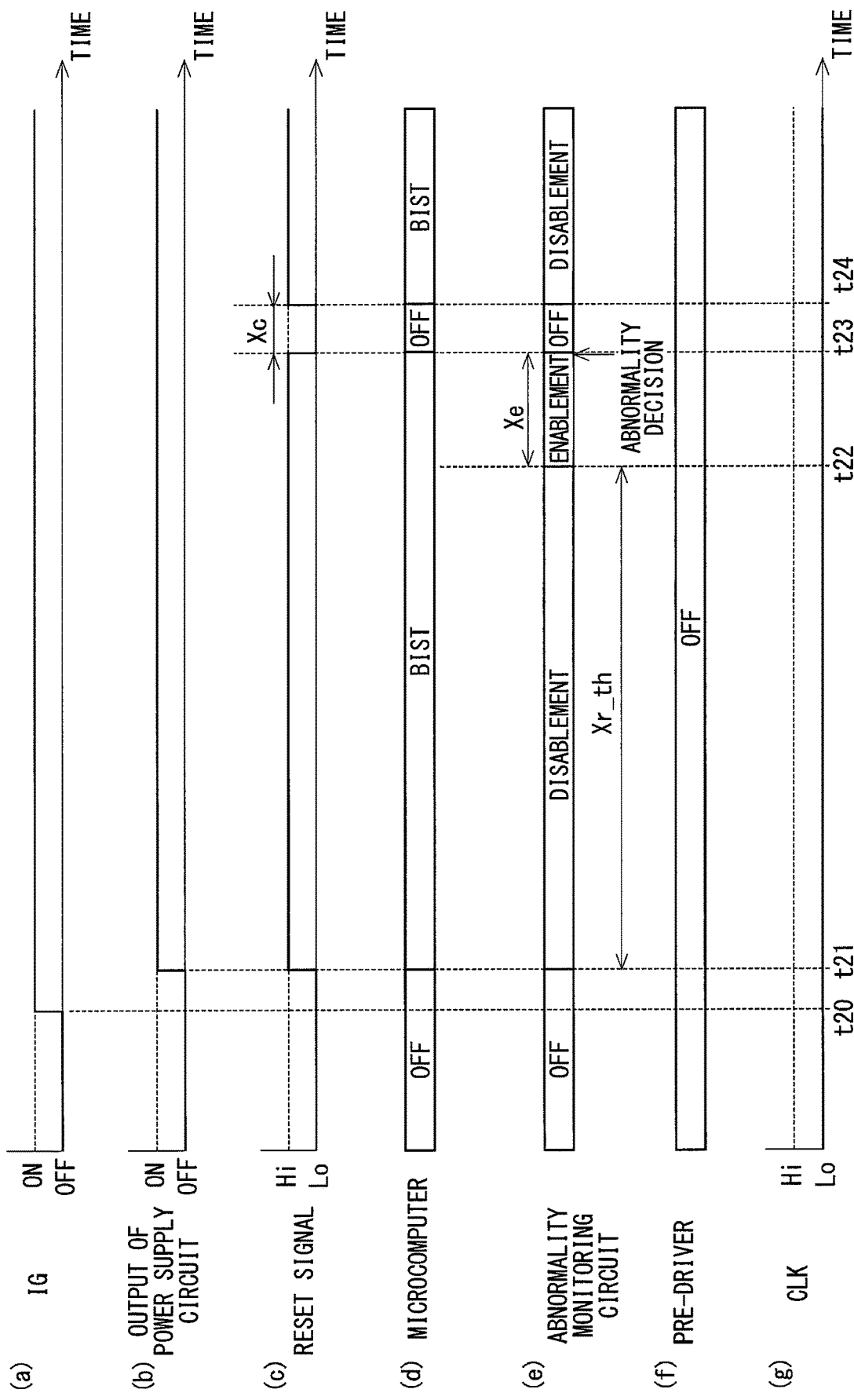
FIG. 6 is a time chart illustrating the abnormality monitoring processing according to the embodiment of the present disclosure.

FIG. 6 is a time chart illustrating an example in which the abnormality occurs during the BIST processing and the BIST processing is not finished normally.

The operation until a time point t21 is similar to the operation until the time point t11 shown in FIG. 5. In the example shown in FIG. 6, the BIST processing is continued even after the reset of the microcomputer 40 is released and the elapse determination time Xr_th elapses. In this case, the user programs do not operate and the clock signal is not output. Therefore, the disablement of the monitoring function is released at a time point t22 when the elapse determination time Xr_th elapses from the release of the reset, and the monitoring function of the abnormality monitoring circuit 23 is enabled. Since the clock signal is not detected, the abnormality monitoring circuit 23 determines that the abnormality occurs in the microcomputer 40.

At a time point t23 when the abnormality decision time Xe elapses after the time point t22, the abnormality monitoring circuit 23 decides the abnormality of the microcomputer 40 and changes the reset signal to "Lo". Accordingly, even when the abnormality of the microcomputer 40 occurs before the BIST processing is finished, the microcomputer 40 is reset.

The processing after the reset of the microcomputer 40 is similar to the example shown in FIG. 5. At a time point t24 when the reset time Xc elapses, the reset signal is changed to "Hi", the reset of the microcomputer 40 is released, and the BIST processing is performed again. After the following BIST processing is finished normally, the processing of the microcomputer 40 and the abnormality monitoring by the abnormality monitoring circuit 23 are performed.

FIG. 8 is a diagram illustrating a comparative example in which the abnormality monitoring processing by the abnormality monitoring circuit 23 is performed during the BIST processing.

The operation until a time point t81 in FIG. 8 is similar to the operation until the time point t11 shown in FIG. 5. In the comparative example, the abnormality monitoring processing of the microcomputer 40 is started concurrently with the tuning on of the power source circuit 21 and the start of the power supplying to the abnormality monitoring circuit 23. At this moment, since the microcomputer 40 is performing the BIST processing and the user programs do not operate, the clock signal is not output from the microcomputer 40 to the combined IC 20. Therefore, the abnormality monitoring circuit 23 determines that the abnormality occurs in the microcomputer 40.

If the abnormality decision time Xe is shorter than a time required for the BIST processing of the microcomputer 40, the abnormality monitoring circuit 23 decides the abnormality of the microcomputer 40 at a time point t82, which is before the BIST processing is finished and after the abnormality decision time Xe elapses. After the abnormality of the microcomputer 40 is decided, the microcomputer 40 is reset at the time point t82 and the reset of the microcomputer 40 is released at a time point t83. Then, the BIST processing is performed again from the beginning.

Similarly, the BIST processing is repeated by the decision of the abnormality, the reset, the release of the reset of the microcomputer 40 from a time point t84 to a time point t85, from a time point t86 to a time point t87, and from a time point t88 to a time point t89. In theses time periods, the user programs do not operate.

Contrastingly, in the present embodiment, the abnormality monitoring circuit 23 has the function of determining that the BIST processing is finished (i.e., the step S104 of FIG. 4). The abnormality monitoring circuit 23 disables the abnormality monitoring function during the BIST processing, and enables the abnormality monitoring function when the BIST processing is determined to be finished. Accordingly, the BIST processing of the microcomputer 40 is restricted from being erroneously determined as the abnormality of the microcomputer 40. That is, the reset of the microcomputer 40 caused by erroneously determining the BIST processing as the abnormality of the microcomputer 40 is avoided. The BIST processing and the reset of the microcomputer 40 are not repeated. The user programs are properly started. Also, the abnormality decision time Xe is determined regardless of the time required for the BIST processing.

The monitoring function of the abnormality monitoring circuit 23 is enabled when the elapse determination time Xr_th elapses after the reset of the microcomputer 40 is released and the BIST processing is started. Therefore, even when the abnormality occurs in the microcomputer 40 during the BIST processing, the reset and the restart of the microcomputer 40 are properly performed.

After the reset of the microcomputer 40, the abnormality monitoring circuit 23 is disabled again. Therefore, the user programs do not operate, and the reset of the microcomputer 40 and the BIST processing are restricted from being repeated.

As described above, the ECU 10 includes the microcomputer 40 and the combined IC 20.

The microcomputer 40 includes the BIST circuit 41, and while the BIST circuit 41 performs the BIST processing, other processing such as the user programs is inhibited.

The combined IC 20 includes the abnormality monitoring circuit 23 and the reset circuit 24. The abnormality monitoring circuit 23 monitors the abnormality of the microcomputer 40. When the abnormality monitoring circuit 23 decides the abnormality of the microcomputer 40, the reset circuit 24 resets the microcomputer 40.

The abnormality monitoring circuit 23 is capable of determining the finish of the BIST processing. The abnormality monitoring circuit 23 disables the abnormality monitoring of the microcomputer 40 while the BIST processing is performed, and starts the abnormality monitoring of the microcomputer 40 when the BIST processing is determined to be finished.

Accordingly, the state where the other processing is not executed because the microcomputer 40 is performing the BIST processing is restricted from being erroneously determined as the abnormality of the microcomputer 40. Additionally, the reset of the microcomputer 40 and the BIST processing are restricted from being repeated, and the user programs are properly started.

The abnormality monitoring circuit 23 starts the abnormality monitoring of the microcomputer 40 when the elapse determination time Xr_th, which is longer than the time required for the BIST processing, elapses after the abnormality monitoring circuit 23 starts the self-diagnosis processing. Even when the abnormality occurs in the microcomputer 40 during the BIST processing, the microcomputer 40 is properly reset.

After the BIST processing is finished, the microcomputer 40 outputs the clock signal to the combined IC 20 at predetermined intervals.

The abnormality monitoring circuit 23 determines that the BIST processing is finished when the clock signal is detected for the predetermined number of times within the determination time Xa.

Using the characteristics that the user programs do not operate during the BIST processing, the abnormality monitoring circuit 23 determines the finish of the BIST processing based on the clock signal output by the user programs. As such, the finish of the BIST processing is accurately determined.

The microcomputer 40 controls the driving of the motor 80. The abnormality monitoring circuit 23 stops the pre-driver 25 for driving of the motor 80 when the abnormality of the microcomputer 40 is decided. As such, the erroneous operation of the motor 80 caused by the abnormality of the microcomputer 40 is restricted.

The electric power steering device 8 includes the ECU 10 and the motor 80. The motor 80 outputs the assist torque assisting the steering of the steering wheel 91 by the driver. By stopping the pre-driver 25 and the motor 80 when the abnormality occurs in the microcomputer 40, although the assisting is changed to the manual assisting, the self-steering, in which the steering wheel 91 operates differently from the user's intention, is restricted.

In the electric power steering device 8, the abnormality decision time Xe is preferred to be set as short as possible to avoid erroneous operations such as the self-steering. The abnormality decision time Xe is a time period from when the abnormality of the microcomputer 40 is detected to when the abnormality of the microcomputer 40 is decided. In the present embodiment, since the abnormality monitoring circuit 23 disables the abnormality monitoring during the BIST processing of the microcomputer 40, the BIST processing is restricted from being erroneously determined as the abnormality of the microcomputer 40. Therefore, the abnormality decision time Xe may be set without considering the time required for the BIST processing. That is, when the abnormality occurs in the microcomputer 40, the driving of the motor 80 is promptly stopped by setting the abnormality decision time Xe to be short.

Other Embodiment (A) Abnormality Monitoring Circuit

In the above embodiment, the abnormality monitoring circuit determines the finish of the self-diagnosis processing based on the clock signal. In other embodiment, the abnormality monitoring circuit may determine the finish of the self-diagnosis processing based on a signal other than the clock signal and output from the control unit to the monitoring unit by the user programs executed after the self-diagnosis processing is finished. For example, the abnormality monitoring circuit may determine the finish of the self-diagnosis processing based on the internal abnormality information according to the internal abnormality monitoring result executed by the user programs separately from the self-diagnosis processing. Accordingly, the finish of the self-diagnosis processing is accurately determined in a device not using the clock signal, such as a device in which the control unit and the monitoring unit communicates by non-synchronous serial communication.

(B) Combined IC

In the above embodiment, the combined IC includes the power source circuit, the communication circuit, the abnormality monitoring circuit, the reset circuit, and the pre-driver. In other embodiment, the power source circuit, the communication circuit, the abnormality monitoring circuit, the reset circuit and the pre-driver may be provided by plural ICs.

(C) Control Unit

In the above embodiment, the self-diagnosis circuit is the BIST circuit. In other embodiment, the self-diagnosis circuit is not limited to the BIST circuit. The self-diagnosis circuit may be any circuit capable of performing self-monitoring of the control unit.

In the above embodiment, the control unit controls the driving of the motor. In other embodiment, the control unit may perform arithmetic processing other than the motor controlling.

(D) Abnormality Monitoring Device

In the above embodiment, the abnormality monitoring device is applied to the electric power steering device. In other embodiment, the abnormality monitoring device may be applied to a device other than the electric power steering device.

Although the present disclosure is described based on the above embodiments, the present disclosure is not limited to the embodiments and the structures. Various changes and modification may be made in the present disclosure. Furthermore, various combination and formation, and other combination and formation including one, more than one or less than one element may be made in the present disclosure.

The invention claimed is:

1. An abnormality monitoring device comprising:
a control unit that includes a self-diagnosis circuit configured to perform a self-diagnosis processing during which other processing is inhibited; and
a monitoring unit that includes an abnormality monitoring circuit and a reset circuit, the abnormality monitoring circuit being configured to perform an abnormality monitoring of the control unit, and the reset circuit being configured to reset the control unit when the abnormality monitoring circuit decides an abnormality of the control unit, wherein
the abnormality monitoring circuit is configured to:
determine whether the self-diagnosis processing is finished;
disable the abnormality monitoring of the control unit during the self-diagnosis processing; and
start the abnormality monitoring of the control unit when the self-diagnosis processing is determined to be finished,
the control unit is configured to output clock signals to the monitoring unit at predetermined intervals after the self-diagnosis processing is finished, and
the abnormality monitoring circuit is configured to determine that the self-diagnosis processing is finished when the abnormality monitoring circuit detects the clock signals for a predetermined number of times within a predetermined determination time.

2. The abnormality monitoring device according to claim 1, wherein
the abnormality monitoring circuit is configured to start the abnormality monitoring of the control unit when an elapse determination time elapses from a beginning of the self-diagnosis processing, the elapse determination time being longer than a time required for the self-diagnosis processing.

3. The abnormality monitoring device according to claim 1, wherein
the control unit is configured to control a driving of a motor, and
the abnormality monitoring circuit is configured to stop a driving circuit for driving the motor when the abnormality of the control unit is decided.

4. An electric power steering device comprising:
the abnormality monitoring device according to claim 3; and
the motor, wherein
the motor is configured to output an assist torque for assisting a steering of a steering member by a driver.

* * * * *